United States Patent
Claybrough

(10) Patent No.: US 10,377,485 B2
(45) Date of Patent: Aug. 13, 2019

(54) SYSTEM AND METHOD FOR AUTOMATICALLY INSPECTING SURFACES

(71) Applicant: DONECLE, Labege (FR)

(72) Inventor: Matthieu Claybrough, Ramonville-Saint-Agne (FR)

(73) Assignee: DONECLE, Labege (FR)

(*) Notice: Subject to any disclaimer, the term of this patent is extended or adjusted under 35 U.S.C. 154(b) by 0 days.

(21) Appl. No.: 15/736,952

(22) PCT Filed: Jun. 15, 2016

(86) PCT No.: PCT/FR2016/051448
§ 371 (c)(1),
(2) Date: Dec. 15, 2017

(87) PCT Pub. No.: WO2016/203151
PCT Pub. Date: Dec. 22, 2016

(65) Prior Publication Data
US 2018/0170540 A1     Jun. 21, 2018

(30) Foreign Application Priority Data

Jun. 15, 2015   (FR) ...................... 15 55452

(51) Int. Cl.
*G05D 1/00*     (2006.01)
*B64C 39/02*    (2006.01)
(Continued)

(52) U.S. Cl.
CPC .............. *B64C 39/024* (2013.01); *B64F 5/60* (2017.01); *G05D 1/0094* (2013.01); *G05D 1/104* (2013.01);
(Continued)

(58) Field of Classification Search
CPC .............. B64C 39/024; B64C 2201/12; B64C 2201/123; B64C 2201/143; B64F 5/60; G05D 1/104
(Continued)

(56) References Cited

U.S. PATENT DOCUMENTS

| | | | |
|---|---|---|---|
| 2010/0103260 A1 | 4/2010 | Williams | |
| 2014/0278221 A1 | 9/2014 | Troy et al. | |
| 2016/0264262 A1* | 9/2016 | Colin | ........................ B25J 5/007 |

FOREIGN PATENT DOCUMENTS

| | | | |
|---|---|---|---|
| WO | WO2015/059241 | 4/2015 | |
| WO | WO-2017153912 A1 * | 9/2017 | ................ B64F 5/60 |

OTHER PUBLICATIONS

Teixeira, et al., "Teleoperation Using Google Glass and AR . . . " 2014 Symposium on Virtual Reality, IEEE, May 12, 2014.
(Continued)

*Primary Examiner* — Gertrude Arthur Jeanglaude
(74) *Attorney, Agent, or Firm* — Steven M. Greenberg, Esq.; Shutts & Bowen LLP

(57) ABSTRACT

The invention relates to a system for automatically inspecting a surface of an object such as an aircraft (54), a transport vehicle, a building or an engineering structure, said surface being liable to contain a defect.

Figure 1:
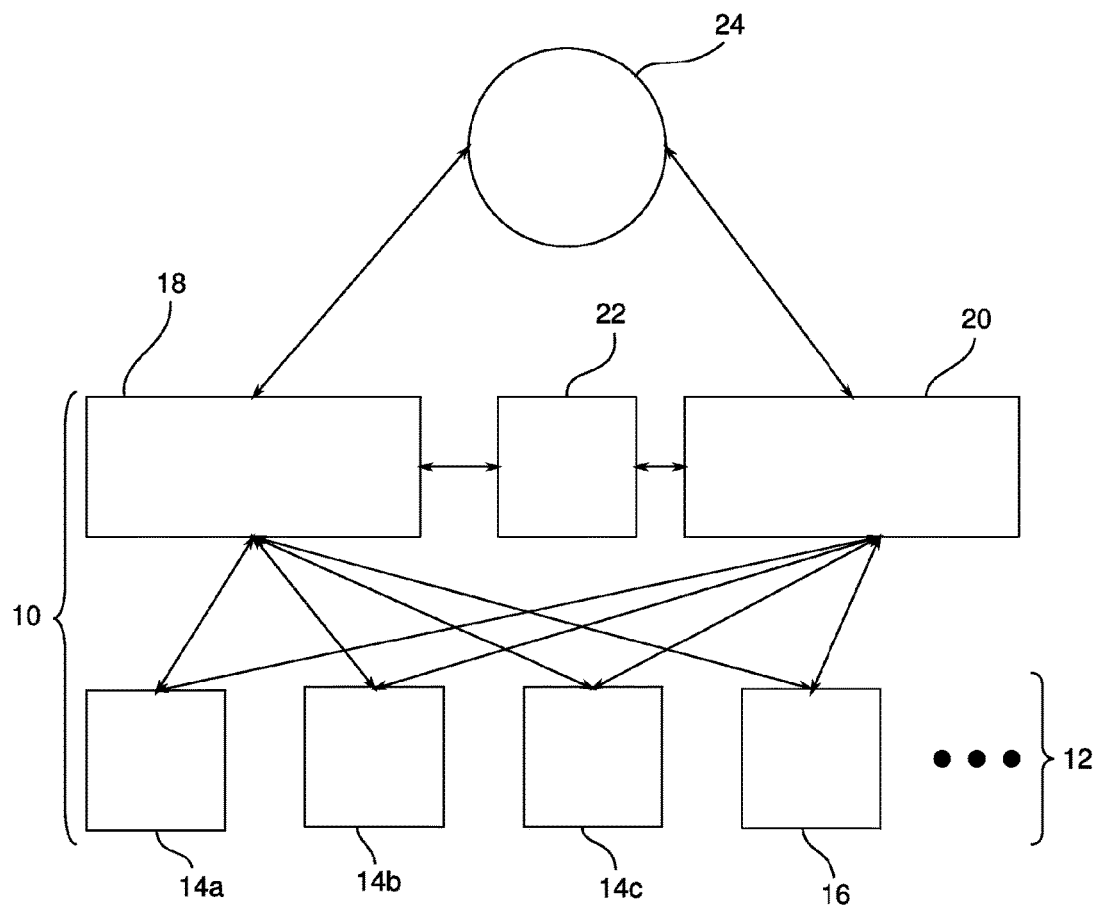

The system is characterized in that it comprises a fleet comprising at least one flying robot (14a, 14b, 14c), each flying robot comprising a module for acquiring images of at least one portion of the surface to be inspected, and a module for processing the acquired images, which module is suitable for providing information representative of the state of each inspected surface portion, which information is called the processing result.

12 Claims, 2 Drawing Sheets

(51) Int. Cl.
  *G05D 1/10* (2006.01)
  *B64F 5/60* (2017.01)
(52) U.S. Cl.
  CPC .... *B64C 2201/12* (2013.01); *B64C 2201/123* (2013.01); *B64C 2201/143* (2013.01)
(58) Field of Classification Search
  USPC .......................................................... 701/3
  See application file for complete search history.

(56) References Cited

OTHER PUBLICATIONS

Lattanzi, "A Computational Framework for Next Generation Inspection Imaging," Washington.edu, Dec. 1, 2013.

\* cited by examiner

SYSTEM AND METHOD FOR AUTOMATICALLY INSPECTING SURFACES

CROSS-REFERENCE TO RELATED APPLICATIONS

This application is a § 371 national phase entry of International Application No. PCT/FR2016/051448, filed Jun. 15, 2016, which claims priority to French Patent Application No. 1555452, filed Jun. 15, 2015.

TECHNICAL FIELD OF THE INVENTION

The invention relates to a system and a method for automatically inspecting large-scale objects. In particular, the invention relates to the detection and locating of defects on hard-to-reach surfaces of said large-scale objects.

TECHNOLOGICAL BACKGROUND

The technical field of the invention concerns the detection and locating of defects visible to the human eye over large surfaces, such as the outer surfaces of large objects, for example aircraft, ships, trains, motor vehicles, buildings or engineering structures. In general, the term "object" shall be understood herein as a tangible thing that can be perceived through sight and touch, made by man and intended for a specific use. Large objects, i.e. objects whose dimensions, bulk and/or weight do not allow them to be carried by a person, generally have hard-to-reach surfaces, for example portions of buildings or engineering structures that are situated at height, the outer hull of large ships, the structure of an oil platform or the upper part of train sections or aircraft fuselages and wings. Detecting and locating defects visible to the eye on this type of large object therefore presents several problems, in particular problems concerning obtaining visual access to the surfaces, detecting defects and locating defects in a coordinate system related to the object. The defects to be detected are, for example, impacts caused by a lightning strike, hail, birds or debris, or corrosion, erosion, paint running or crack defects, etc.

Defects are detected and located by inspecting the surfaces of the objects. A plurality of inspection systems and methods have been proposed in order to overcome these problems.

In general, inspections are currently performed by human operators. Specific equipment is used to provide said operators with visual access to the surfaces, for example the use of cherry pickers or scaffolding, etc. For more hard-to-reach surfaces, the operator may, for example, also be required to use binoculars or equivalent optical means.

Human operators are specially trained to detect defects by inspecting surfaces. The detection of these defects is therefore reliant on the experience and perception of the operators. Once a defect has been detected, the operator is responsible for locating said defects, i.e. for recording the absolute location of the detected defect, or more commonly the location thereof relative to one or more points of reference present on the object. These points of reference can be, for example depending on the type of object inspected, windows or portholes, structural elements such as cables, posts, columns, frames, spars, stringers, textual markers, or specific distinctive elements, etc. A defect is thus located by firstly determining at least one point of reference, and then by measuring the position of the defect relative to each reference point.

However, these inspections performed by one or more human operators have several drawbacks.

The installation of specific equipment such as scaffolding in order to obtain visual access to the surfaces is time-consuming and expensive, and does not systematically provide easy access to the surfaces to be inspected. The use of binoculars or equivalent optical means in order to overcome this drawback is unsatisfactory as this reduces the efficiency of the inspection. Moreover, the use of specific equipment generally increases safety risks for the operator, in particular falling or crushing risks, or any other risk brought about by the use of specific equipment such as cherry pickers or scaffolding. The specific equipment also generates risks for the object, in particular collision risks capable of causing deterioration. Depending on the fragility of the object, this deterioration could have significant repercussions, such as immobilisation or grounding (for vehicles and aircraft), expensive repairs or the permanent suspension of operation. These drawbacks and risks are all the more important as the number of operators increases.

Furthermore, the detection performed by the operators is imperfect, as an operator could forget to visually scan a portion of the surface, in particular if the surface is hard to reach. The operator could also treat the surfaces unequally depending on whether they are easy to reach. Finally, the subjectivity of each operator can result in a different classification of the elements perceived (for example between major defects, minor defects, normal wear or marks), which could lead the operator to ignore or only belatedly detect certain defects. Moreover, the operators must be specially trained for the inspection, which reduces the number of operators capable of performing the inspection and requires additional management with regard to the availability and cost of a team of trained operators.

Finally, the locating techniques can produce errors, in particular with regard to the selection and identification of the points of reference, for example if this selection requires a high number of repetitive elements to be counted (portholes, windows, columns, etc.), which can be added to the conventional errors made when measuring from one or more points of reference.

The inspections performed with the existing systems and methods are also subjected to an additional speed problem. Current inspections generally require the operation of the object to be suspended over a long period of time. In order to improve inspection speed, the number of operators responsible for conducting this inspection must be increased, which in particular generates additional costs and increases the risks described hereinabove.

Solutions have been proposed to overcome these drawbacks. For example, the use of a rolling robot equipped with optical means designed to better detect and locate defects, and thus reduce the subjectivity of the detection and location determination errors. However, the problem of acquiring visual access remains and the method is slow, insofar as an operator is required to intervene for each detection. Another solution involves placing the object to be inspected in a hangar equipped with a plurality of cameras capable of inspecting the surface of the object. This system however cannot be used for buildings and engineering structures, cannot be displaced and is not modular. In particular, such a system requires the object to be inspected, for example an aircraft, to be transported to the hangar, which is expensive and complex.

The inventors have therefore sought to propose an inspection system and method that overcomes at least some of the drawbacks of known systems and methods.

PURPOSES OF THE INVENTION

The purpose of the invention is to overcome at least some of the drawbacks of known systems and methods for inspecting surfaces.

In particular, the invention aims to provide, in at least one embodiment thereof, an inspection system and method that limit the number of required human operators.

The invention further aims to provide, in at least one embodiment, an inspection system and method for inspecting hard-to-reach surfaces without requiring the implementation of specific equipment such as scaffolding.

The invention further aims to provide, in at least one embodiment thereof, an inspection system and method for quickly inspecting a large surface.

The invention further aims to provide, in at least one embodiment, an inspection system and method allowing an inspection to be conducted by human operators having undergone little or no training.

The invention further aims to provide, in at least one embodiment, an inspection system and method for better locating defects on the surface.

The invention further aims to provide, in at least one embodiment, an inspection system and method providing an increased repeatability of the inspections and detection of defects.

DESCRIPTION OF THE INVENTION

For this purpose, the invention relates to a system for automatically inspecting a surface of an object such as an aircraft, transport vehicle, building or engineering structure, said surface being liable to contain a defect, characterised in that it comprises a fleet, comprising at least one flying robot, each flying robot comprising:
  a module for acquiring images of at least one portion of the surface to be inspected, and
  a module for processing the acquired images, which module is suitable for providing information representative of the state of each inspected surface portion, which information is called the processing result,
the automatic inspection system further comprising a module for managing the fleet of robots, the management module being suitable for determining, from a model of the surface to be inspected, a set of displacement instructions and image acquisition instructions for each robot of the fleet.

An automatic inspection system according to the invention therefore allows for an inspection, via one or more flying robots (commonly called drones or unmanned aerial vehicles); the inspection system therefore significantly reduces the number of human operators required, as each flying robot of the fleet inspects one portion of the surface of the object to be inspected. The quantity of equipment required is thus reduced, in addition to the safety risks for the operators.

Moreover, the capacity of flying robots to move in the air allows them to easily access hard-to-reach surface portions of the object, for example the upper part of an aircraft or train. These portions therefore benefit from a high-quality inspection similar to that of the more easy-to-reach portions.

The use of a fleet of flying robots improves the inspection speed, in particular for very large surfaces, by using a number of flying robots adapted to the dimensions of the surface to be inspected. Whereas the significant size of the specific equipment such as aerial lifts and scaffolding of the prior systems limited the number of operators capable of simultaneously performing an inspection, the reduced dimensions of the flying robots allows a larger number of these robots to be used in order to perform a faster inspection. Moreover, the system is lightweight, easy to transport and therefore mobile, i.e. it can be moved to the object and does not require the object to be moved to a specific location.

The processing of the data acquired by the acquisition module of the flying robot, and in particular the processing of at least one image of a portion of the surface inspected, takes place in a processing module on board the flying robot, which accelerates the inspection and detection of defects, limits the number of human operators required for the inspection, and allows for a more homogeneous inspection and detection of the surface. The processing operation provides information representative of the state of the inspected surface, and in particular determines the presence of possible defects on the surface; this determination is not dependent on the subjectivity of a human operator, and therefore provides for a more consistent inspection. Moreover, the inspection no longer requires specially trained human operators to conduct the inspection.

The information representative of the state of the inspected surface, provided by the processing module, is called the processing result hereafter. In particular, the processing result comprises the presence or absence of a potential defect on the surface portion inspected.

By way of the processing operation performed by each flying robot, a human operator with little or no training can acknowledge the processing results and focus only on the portions of the surface showing a potential defect, without being required to visually inspect the surface or look at images of all surface portions. Moreover, each flying robot can transmit the processing results only, and not images of the entire surface, which reduces the quantity of data transmitted within the entire system and allows for the use of a larger number of flying robots in order to speed up the inspection. The processing load is therefore distributed in each flying robot.

Preferably, the flying robot is a helicopter or multi-rotor (generally a quadrotor) type robot, capable of stationary flight. This type of flying robot allows for easy take-offs from and landings on a reduced surface area, for movements at a variable speed, in particular at a slow speed to more precisely locate the defect and to improve safety, and is capable of stopping and changing direction, or of travelling in the opposite direction in the presence of an obstacle in the trajectory thereof. Stationary flight or flight at a slow speed further eases image acquisition and improves the quality of the images acquired.

Advantageously and according to the invention, the fleet comprises between one and ten flying robots. Preferably, the fleet comprises three flying robots, which is a good compromise between speed of execution, cost and reducing collision risks between flying robots.

The management module is designed for the centralised programming of the inspection by determining instructions for each robot of the fleet, for example according to the number of available robots of the fleet, the type of object to be inspected, the size of the surface to be inspected, and the inspection time, etc. Each instruction determines a task to be carried out by each robot. The robots of the fleet are therefore autopiloted by carrying out the tasks allocated thereto. They do not require human operators for the control thereof, thus reducing the need for operator training, in addition to the risks of a piloting error, which could, for example, result in collisions between robots of the fleet or between a robot of the fleet and the object. Moreover, each robot can perform the inspection without requiring visual contact between a human operator and each robot. Therefore, each robot, in particular a control module of each robot, automatically carries out the tasks, including displacement tasks, and therefore allows the robot to move in an autonomous manner, without the need for a remote pilot or control station.

Preferably, the management module determines the instructions such that the inspection is performed in minimal time, as a function of the number of robots of the fleet.

According to alternative embodiments of the invention, the management module can be on board a robot of the fleet, or incorporated into an independent management device, for example a computer, or distributed between various robots of the fleet.

Preferably, in the alternative embodiments wherein the management module is incorporated into an independent device for managing the robots of the fleet, the management device comprises a human-machine interface allowing interaction with a human operator.

Advantageously and according to the invention, the image acquisition module of at least one robot of said fleet comprises at least one camera suitable for acquiring images within the visible light spectrum.

According to this aspect of the invention, the camera allows the system to perform a visual inspection in the same manner as would a human operator. The system performs an image processing operation on an image within the visible light spectrum, called a visible image, allowing known, effective and proven visible image processing techniques to be used.

Advantageously, a system according to the invention comprises a device for presenting the results of each processing operation performed by the processing module of each robot of the fleet, and each robot of the fleet comprises a communication module suitable for transmitting results of each processing operation to the presentation device.

According to this aspect of the invention, each flying robot transmits the results of the processing operations performed on the images acquired to the presentation device so that a human operator can interpret them. Given that the results transmitted by each robot of the fleet are representative of the state of the inspected surface, they in particular allow a classification to be proposed for classifying the potential defects detected, and for example allow the image acquired, the associated result and a classification of the potential defect to be displayed on a screen of the presentation device, or a report to be generated comprising the list of potential defects detected.

Advantageously, in one embodiment wherein the management module is incorporated into a management device, the management device and the presentation device are arranged in a control device. The functions of the management module and of the presentation device are therefore grouped together in the same device.

Advantageously, the control device comprises a human-machine interface suitable for displaying a 3D model of the surface to be inspected and for displaying a representation of a position of each robot of the fleet relative to the surface to be inspected in real time.

According to this aspect of the invention, the human-machine interface allows a human operator to view the position of each flying robot relative to the object and the surface thereof, to view the potential defects displayed on the 3D model, and to potentially conduct a remote intervention on the flying robots if necessary, for example in order to perform an emergency stop.

Advantageously and according to the invention, each robot of the fleet comprises a location determination module, suitable for combining each processing result with a location of said processing result relative to a coordinate system with regard to the surface to be inspected.

According to this aspect of the invention, the system allows the location of the processing results to be more accurately determined, and therefore that of the potential defects, compared to the location as determined by a human operator according to the prior art. The location of the results is determined by each robot of the fleet according to the location of said robot and the parameters of the image acquisition module at the time of image acquisition.

According to an alternative embodiment of the invention, the image processing module is designed to recognise elements of the object, the location of which is known, thus more precisely determining the location of the results.

If the inspection system comprises a presentation device, said device is suitable for presenting each result and the location associated with said result.

Advantageously and according to the invention, each robot of the fleet comprises an emergency module suitable for detecting a robot malfunction and, using a set of emergency tasks determined according to a position of the robot of the fleet relative to the object, said robot of the fleet is capable of performing at least one emergency task in the event of a malfunction.

According to this aspect of the invention, an emergency manoeuvre is continuously determined, and the robot will perform this emergency manoeuvre in the event of a malfunction, for example in the event of a lost connection to a management module, a malfunction of the location determination module, or an engine failure, etc. The emergency manoeuvres are designed to prevent deterioration of the object, the surface of which is being inspected, in particular if this surface is fragile (for example an aircraft). The purpose of the emergency tasks is generally to distance the robot from the object, and they depend on the location of the robot relative to the object. According to a plurality of alternative embodiments of the invention, all emergency tasks are determined either by the management module or by each robot. In the event that each robot determines all of the emergency tasks, each robot transmits all tasks to the management module so that it can determine whether a robot runs the risk of colliding with another as a result of these tasks.

Advantageously and according to the invention, each robot of the fleet comprises a buffer memory module, suitable for storing a plurality of processing results.

According to this aspect of the invention, the processing results can be stored while awaiting transmission to an external back-up system, for example incorporated into the presentation device. Moreover, in the event of a malfunction of the robot, the results stored in the buffer memory module can be manually recovered if they have not been transmitted.

Advantageously and according to the invention, each robot of the fleet comprises an obstacle detection module, whereby each robot of the fleet is suitable for performing an avoidance task to avoid at least one obstacle detected by the obstacle detection module.

According to this aspect of the invention, each flying robot is capable of modifying its displacement if an obstacle is detected.

Preferably, if an obstacle detection module detects an obstacle, each robot of the fleet is capable of transmitting the position of said obstacle to the other robots of the fleet. Therefore, the information on the position of the obstacle is shared and the robots of the fleet can act accordingly, for example by modifying their trajectory.

Advantageously and according to the invention, the fleet comprises at least one rolling robot, each rolling robot comprising:
- a module for acquiring images of at least one portion of the surface to be inspected, and
- a module for processing the acquired images, which module is suitable for providing information representative of the state of each portion of the inspected surface, which information is called the processing result.

According to this aspect of the invention, the fleet comprising at least one flying robot can be complemented by a rolling robot comprising the same modules, in order to access areas that are hard to reach by flying robots, for example beneath the fuselage of an aircraft.

The invention further relates to a method for using an automatic inspection system according to the invention, characterised in that it comprises:
- a step of determining, by the management module, a set of instructions allocated to each robot of the fleet,
- a step of carrying out the tasks by each robot of the fleet, said tasks comprising at least one acquisition performed by the acquisition module of an image of a portion of the surface to be inspected, and comprising at least one processing operation performed by the processing module of said image in order to detect a potential defect on the surface to be inspected,
- a step of transmitting the result of said processing operation of each robot to a presentation device,
- a step of presenting said processing result to a human operator.

A method for use according to the invention therefore allows an inspection system according to the invention to be used by allocating tasks to each robot of the fleet as a function of the model of the surface to be inspected in order to optimise the surface inspection speed. For example, each robot is assigned a portion of the surface to inspect.

The step of presenting the results transmitted by one of the robots of the fleet is, for example, an on-screen display or the generation of a report, etc.

Advantageously and according to the invention, the step of transmitting the result of said processing operation by each robot is carried out after each processing operation by a processing module.

According to this aspect of the invention, a result is transmitted immediately after each processing operation, thus allowing the information on the presence of potential defects to be progressively obtained over time, without waiting for the inspection to be completed. The transmission is carried out as soon as possible, i.e. by taking into account the different processing times and the availability of a transmission channel allocated to the transmission if said channel is shared between a plurality of flying robots.

The invention further relates to a method for automatically inspecting a surface of an object such as an aircraft, transport vehicle, building or engineering structure, said surface being liable to contain a defect, characterised in that it comprises:
- a step of acquiring images of at least one portion of the surface to be inspected by each flying robot of a fleet of robots comprising at least one flying robot, and
- a step of processing the acquired images in order to provide information representative of the state of each inspected surface portion, which information is called the processing result.
- a step of determining, based on the model of the surface to be inspected, a set of displacement instructions and image acquisition instructions for each robot of the fleet.

Advantageously, the inspection method according to the invention is implemented by the inspection system according to the invention.

Advantageously, the inspection system according to the invention implements the inspection method according to the invention.

The invention further relates to an automatic inspection system, a method for using said system and an automatic inspection method, jointly characterised by all or part of the characteristics disclosed hereinabove or hereinbelow.

LIST OF FIGURES

Figure 2:
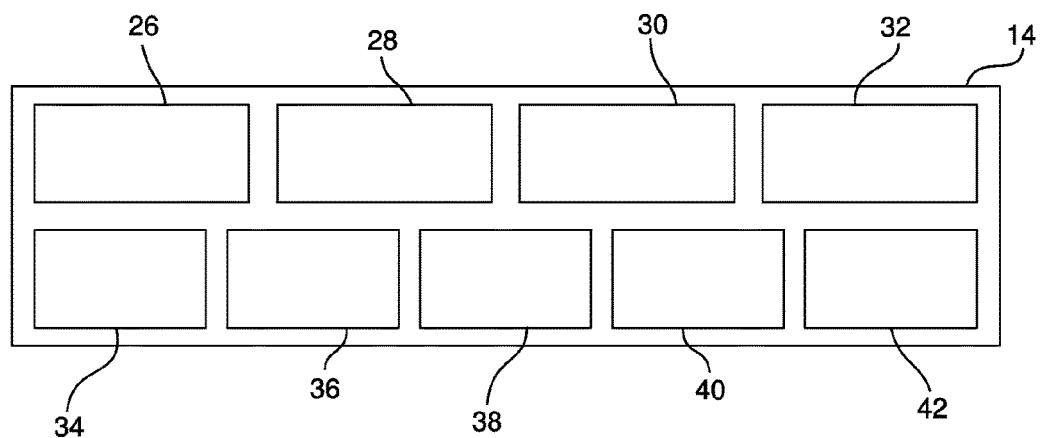
Figure 3:
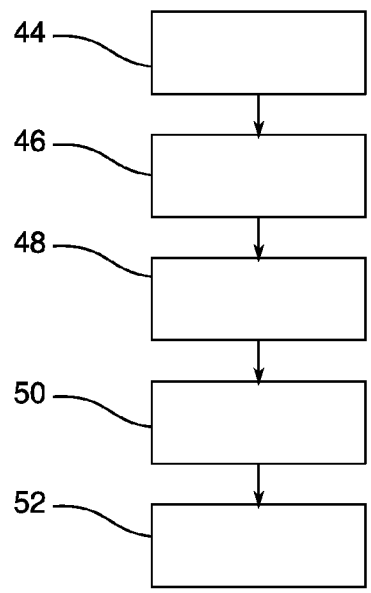
Figure 4:
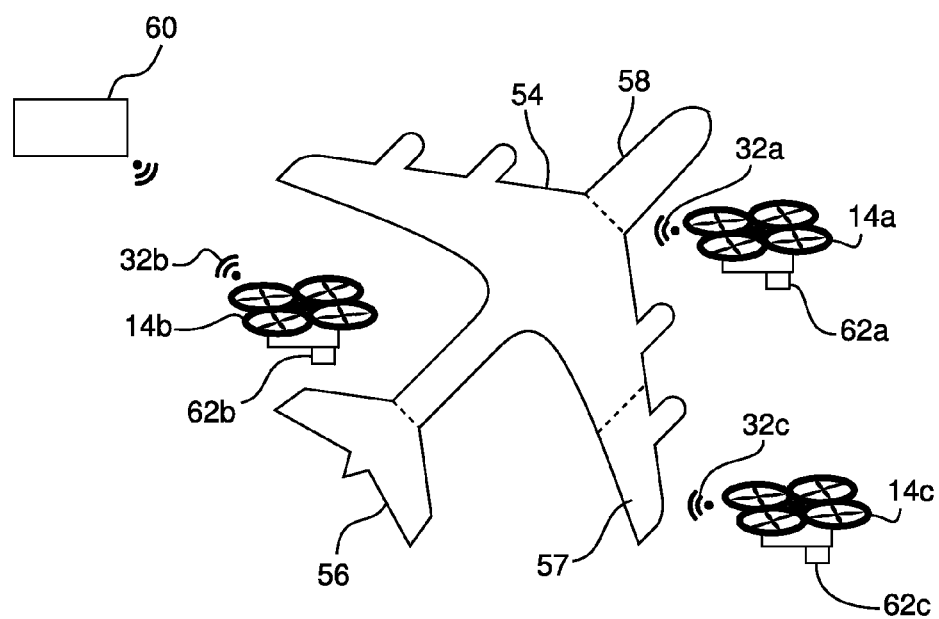

Other purposes, characteristics and advantages of the invention will be better understood upon reading the following description which is not intended to limit invention and given with reference to the accompanying figures, in which:

FIG. 1 is a diagrammatic view of the automatic inspection system according to one embodiment of the invention, FIG. 2 is a diagrammatic view of a robot of a fleet of an automatic inspection system according to one embodiment of the invention, FIG. 3 is a diagrammatic view of the automatic inspection method according to one embodiment of the invention, FIG. 4 is a diagrammatic view of a fleet of robots of an automatic inspection system according to one embodiment of the invention, wherein the object is an aircraft.

DETAILED DESCRIPTION OF ONE EMBODIMENT OF THE INVENTION

The following embodiments are examples. Although the description refers to one or more embodiments, this does not necessarily mean that each reference relates to the same embodiment, or that the characteristics apply only to a single embodiment. Simple characteristics of different embodiments can also be combined in order to provide other embodiments. For illustration and clarity purposes, the scales and proportions are not strictly respected in the figures.

FIG. 1 diagrammatically shows a system 10 for automatically inspecting a surface of an object such as an aircraft, transport vehicle (rail vehicle, motor vehicle, etc.), building, engineering structure, or any other large-scale object, the inspection surface of which is large, according to one embodiment of the invention. The purpose of the inspection system 10 is to detect potential defects on the surface of the object. The inspection system 10 comprises a fleet 12 comprising at least one flying robot, and in this case three flying robots 14a, 14b, 14c. The fleet 12 can also comprise one or more robots of a different type, for example a rolling robot 16, or any other robot suited to the object to be inspected, for example a submarine robot for the inspection of an oil platform. The flying robots 14a, 14b, 14c are also commonly called drones or unmanned aerial vehicles (UAV) and take on the form of a helicopter, quadrotor or multi-rotor capable of stationary flight. In order to reduce the risks of damaging the object in the event of a collision with a robot of the fleet 12, said robots are equipped with protections.

Each robot 14a, 14b, 14c, 16 of the fleet 12 is capable of communicating with both a management module 18 and a presentation device 20. In another embodiment, not shown, the management module 18 is on board one of the robots of the fleet 12.

The management module 18 and the presentation device 20 are connected, in this embodiment, to a web server 22 that can be accessed via a telecommunications network. Moreover, the management module 18 and the presentation device 20 can be embedded into the same control device, for example a computer or a tablet.

A human operator 24 can interact with the management module 18 and the presentation device 20 via one or more human-machine interfaces. The interface contains an interactive 3D display, including a 3D model of the object to be inspected, in addition to the real-time position of the robots 14a, 14b, 14c, 16 and of any potential defects detected.

FIG. 2 diagrammatically illustrates a robot 14 of the fleet 12 according to one embodiment of the invention.

The robot 14 comprises a module 26 for acquiring images of the surface to be inspected and a module 28 for processing the images acquired. The image acquisition module 26 comprises at least one sensor, for example a camera designed to acquire images within the visible light spectrum. In order to improve the quality of the image acquired, the acquisition module can also comprise a lighting device for providing light within the visible light spectrum.

Moreover, in this embodiment of the invention, the robot 14 comprises:
- an emergency module 30, suitable for detecting malfunctions,
- a communication module 32 for communicating with the management module 18 and the presentation device 20,
- a control module 34 for controlling the robot, suitable for processing instructions for piloting the robot, which instructions originate from the management module 18 or from the other modules on board the robot 14,
- a location determination module 36,
- a module 38 for stabilising and guiding the robot, in particular controlling the motors of the robot 14 according to the displacement instructions transmitted by the control module 34,
- a buffer memory module 40,
- an obstacle detection module 42.

These modules are present, for example, in the form of electronic components, whereby a plurality of modules can be grouped into the same electronic component, and whereby a module can be comprised of a plurality of interacting electronic components. The modules can also be implemented in the form of a computer programme executed by one or more electronic components, for example a computer processor, a microcontroller, a digital signal processor (DSP), or a field gate programmable array (FGPA), etc.

FIG. 3 shows a method for automatically inspecting the surface of the object according to one embodiment of the invention. The method is implemented by the automatic inspection system 10 according to the aforementioned embodiment.

The first step of the method is a step 44 for configuring the inspection, and is performed by the human operator 24 on the management module, via a human-machine interface. The human operator 24 has access to a plurality of parameters, for example:
- the object to be inspected: the human operator 24 selects a model, for example a 3D model, of the surface of the object to be inspected from among a selection of predefined models that can be accessed, for example, on the web server 22;
- the environment of the object: the human operator 24 can input whether the object is situated outdoors, or in a hangar, etc. in order to determine whether the robots are subjected to specific restrictions regarding the displacement thereof about the object (for example obstacles);
- the description of the fleet 12: the number of robots used and the type thereof (flying or ground robots, equipped with specific types of acquisition modules or sensors, etc.);
- the task to be carried out: quick inspection, in-depth inspection, partial inspection, etc.

Once the parameters have been validated by the human operator 24, the inspection method moves on to a step 46 for determining a set of instructions. This determination step 46 is carried out by the management module 18. It consists in determining, according to the parameters chosen by the human operator 24 in the preceding step and in particular according to the model of the surface to be inspected, a set of displacement instructions and a set of image acquisition instructions that are allocated to each robot of the fleet 12. The inspection is therefore broken down into various tasks, which are translated into instructions issued to the robots of the fleet 12, providing coverage of the entire surface to be inspected, according to the model of said surface. The displacement instructions contain directives for defining the three-dimensional trajectory in addition to the orientation of the flying robots. These displacement instructions are, for example, a displacement of a flying robot from a point A (having the coordinates (Ax, Ay, Az)) to a point B (having the coordinates (Bx, By, Bz)) with a constant orientation. The instructions for acquiring an image of a surface of the object at point B comprise, for example, directives regarding the control of the image acquisition module, in particular the orientation thereof in space, the settings of the optical and capture system thereof, and a triggering directive. The instructions can then be a processing operation for processing said acquired image, a displacement to a new point C (having the coordinates (Cx, Cy, Cz)), and a new image acquisition, etc. Therefore, the management module 18 allows instructions to be generated for a fleet of flying robots based on a reference surface, allowing said flying robots to carry out an inspection in an automatic manner.

The instructions allocated to each robot of the fleet 12 are transmitted to said robots by the management module 18 in order to allow the tasks connected to said instructions to be carried out in a step 48 for the execution of the tasks by each robot of the fleet 12. According to the embodiments, each robot receives all instructions allocated thereto before the execution step 48, or only a first part of the instructions, whereby the following instructions are sent during the execution step 48. In both cases, the management module 18 can change the tasks currently being executed by sending new instructions in the event of a change of situation, for example it can allocate a new surface portion to a robot if the robot that was originally intended to acquire an image of said surface portion is experiencing a malfunction. The robots of the fleet 12 can also transmit information to the management module 18 concerning the state of said robots, the task completion progress and any other information capable of resulting in the sending of new instructions by the management module 18.

The tasks of each robot of the fleet 12 are processed by the control module 34 of said robot. In particular, the control module 34 stores the instructions received, sequences said instructions, performs the calculations linked to said instructions in order to determine the associated tasks, controls the different modules according to the tasks, and calculates the state of the robot, etc. Therefore, the control module 34 automatically executes the tasks, including the displacement tasks, and therefore allows the robot to move in an autonomous manner, without requiring an autopilot system or control station.

During the execution step 48, each robot of the fleet 12 carries out at least one acquisition of an image via the acquisition module 26 thereof, and a processing operation of the image acquired via the processing module 28 thereof.

The image is acquired by one or more sensors of the acquisition module 26, allowing different image types to be obtained, depending on the sensor used. For example, the sensors can be infrared sensors, cameras for the visible spectrum, ultraviolet sensors, or any other sensor allowing the formation of an image of electromagnetic or acoustic waves in a frequency band. The sensor can also be a 3D sensor, such as a depth sensor, time of flight (TOF) sensor, infrared pattern projection sensor or stereoscopic sensor, etc. Finally, a sensor can acquire images of the same portion over a plurality of frequency spectra (hyperspectral imaging).

The processing of the image by the processing module 28 consists of providing a result representative of the state of the inspected surface. The processing module 28 thus determines, from the acquired image, the presence of a potential defect on the surface, for example by comparing the image acquired with a previous image of the same surface (recovered from the web server or provided by the management module), or by detecting sudden variations in colour or appearance (fineness, grain, blurring, shine, etc.), etc.

The processing module 28 uses predefined and preconfigured algorithms. For example, according to one embodiment of the invention, the processing module 28 implements the following steps for each image:
- a first step of normalising the image, which consists of applying a first set of digital filters configured as a function of the parameters of the image, intended to compensate for external variations (lighting, etc.), reduce the effect of interference (reflections, etc.), and compensate for deformations resulting from the lens (geometry and lighting),
- a second step of locating the image which, based on a positioning of the robot (i.e. the position of the robot in space and the angle of orientation of the robot), on the position and angle of the acquisition sensor of the acquisition module 26, for example a camera, and on the distance between the camera and the surface, determines the coordinates in a coordinate system relative to the surface of the set of points of the image,
- a third step of segmenting the image and extracting the contours of all of the shapes capable of representing potential defects, and of generating a sub-image containing the potential defect, also called a zone of interest, for each of said shapes. One image can lead to the generation of no zone of interest or of a plurality of zones of interest.

The processing module then calculates, for each zone of interest of the image, a set of parameters according to pre-recorded algorithms, then classifies and characterises the zones of interest based on this set of parameters. Algorithms that do not require any data other than the zone of interest, and the calculated parameters of which are called descriptors, can be singled out. For each parameter, the following steps are carried out:
- a digital filter is applied,
- the parameter on the filtered zone of interest is calculated.

The filter is chosen according to the desired parameter. For example, the digital filter is a Gaussian filter for reducing noise, a gradient-type filter for detecting sudden variations, a colorimetric filter for calculating the descriptors for certain frequency combinations only, and a frequency filter for detecting certain patterns, repetitions or textures.

For example, several descriptor families are used:
- geometric descriptors (perimeter, greatest dimension, smallest dimension, width/height ratio, number of breaks in the contour, average curvature of the contour, etc.),
- descriptors directly concerning the pixels: statistic moments (mean, variance, asymmetry, kurtosis, etc.) and other mathematical operators (maximum, order difference, entropy, uniformity, etc.). The descriptor can also be applied to a sub-assembly of the pixels meeting a specific criterion, for example a value that is greater than or less than a predetermined threshold.

With regard to the use of other external data to calculate the parameter, the algorithm comprises, for example, the following steps:
- determining a reference zone of interest by extracting the same area of surface as the processed zone of interest from a reference image. The reference image can, for example, be an image of said area taken at a prior date (for example available on the web server 22) or a computer-generated image based on the model of the surface. According to one preferred embodiment, a plurality of images can be used, whereby the parameters are calculated for each reference image,
- calculating parameters expressing the difference between the zone of interest acquired and each reference zone of interest, said parameters being, for example, mathematical norms on the difference between the zone of interest and the reference zone of interest, correlation indices, or a histogram comparison, etc. These methods are generally implemented locally, around the points of interest of the zone of interest.

The final step consists of classifying and characterising the zone of interest from the set of calculated parameters. The classification consists of determining the type of the potential defect, for example from the following categories: "oil stain", "corrosion", "missing element", "lightning strike", "scratch", "not a defect", "unknown", etc. The characterisation consists of determining a category of the zone of interest from a predetermined set, for example; "acceptable defect, unacceptable defect", in addition to the size of said potential defect.

The classification and characterisation can be performed by a known classifier, such as a linear classifier, a naïve Bayesian classifier, a support vector machine (SVM) classifier, or neural networks, etc.

In this embodiment, all zones of interest classified as containing a defect or being unknown, alongside the location, classification and characterisation thereof, form the processing results.

According to one advantageous embodiment, the results can be transmitted on the web server, which has the capacity to learn, i.e. improve the algorithms and settings thereof progressively with the results. This web server is therefore capable of sending new, more precise settings to the module 28 for processing the images acquired and of removing any doubts regarding the results classified with a poor confidence index or classified in an "unknown" category.

The result of this processing operation is the detection or non-detection of a potential defect, and potentially a classification of the potential defect according to the severity thereof. The result of each processing operation is stored in the buffer memory module 40 of the robot 14.

Each result is associated with a location provided by the location determination module 36. Said location is expressed according to a coordinate system relative to the surface to be inspected in order to be easily found by a human operator. The location determination module 36 is used to determine the positioning of the robot 14, and to deduce therefrom the location of said result relative to said positioning. The positioning of the robot 14 is determined by one or more equipment items for absolute location determination, for example a global positioning system (GPS), one or more inertial navigation equipment items, for example by an accelerometer, gyroscope, or magnetometer, etc., and/or one or more equipment items for relative location determination, for example radar, ultrasound, laser rangefinder, infrared, image processing, relative to ground markers, etc., or a combination thereof. The location of the result is then determined relative to the positioning of the robot, by the image processing module, as explained hereinabove. The position of the robot and the location of the result can be determined using a combination of different technologies, which are, for example, associated by hybridisation via a Kalman filter, allowing the result to be more precisely located.

Each result of each processing operation and the location of said result are transmitted by the communication module 32 to the presentation device 20 during a result transmission step 50. According to the embodiments, the result can be transmitted once the inspection is complete, or continuously during the inspection. When a result is transmitted, the presentation device 20 sends an acknowledgement to the robot 14, which deletes the result from its buffer memory module 40.

The result is then presented to a human operator via the presentation device 20 during a presentation step 52. The results can be presented in several forms and via different types of human-machine interfaces, for example interfaces that comprise a 3D representation of the model used to determine the instructions, on which the potential defect is positioned, a display of the image of the surface that is associated with the result on a screen, or the generation of a written report, etc. The report comprises, for example, a list of potential defects detected, the location thereof, the classification thereof (type of defect), and the characterisation thereof (size and severity of the defect). The operator can then launch another automatic inspection method with new parameters, for example in order to inspect the portions containing detected potential defects in a more precise manner or with new sensors. Each result can also be stored in memory in order to create a historical log of the inspections performed for the same object. This historical log can be transmitted to the web server for future use, potentially in a different environment (for example for aircraft, the inspection of which can take place in various locations), or for further processing.

Certain situations can cause each robot of the fleet 12 to execute tasks differing from those initially planned in the instructions originating from the management module.

For example, the obstacle detection module 42 is designed to detect obstacles and transmit tasks to the control module 34 of the robot, which executes said tasks in order to avoid the obstacle, and potentially to report it to the human operator 24 via the presentation device 20, as well as to the management module 18 so that it can modify the displacements of the other robots of the fleet 12 where necessary, and/or send new instructions to the robot having detected the obstacle. The robot can also directly inform the other robots.

The emergency module 30 can also transmit emergency tasks to the control module 34 in the event of a malfunction affecting the flying robot. The emergency module 30 is designed to detect malfunctions. A set of emergency tasks is determined for each anticipated case of malfunction, adapted according to the position of the robot relative to the object, which determination is carried out either by the emergency module 30 or by the management module 18. For example, in the case of an aircraft with fixed wings, a flying robot situated above a wing will distance itself laterally before landing vertically, whereas a robot situated beneath the aircraft will immediately land.

More specifically, the set of emergency tasks is regularly updated, for example every second, and is designed to determine a sequence of instructions implemented by the robot as a function of the situation in which it finds itself.

The emergency tasks corresponding to a location determination system error or loss for a robot situated above the wing of an aircraft take into account the positional error and comprise a lateral distancing with larger margins to guarantee that no contact is made between the robot and the wing. Therefore, the emergency module is configured to detect a wide range of malfunctions and execute the most appropriate response to each.

The malfunctions that can be detected by the emergency module 30 are, for example, a loss of the data link, a robot positioning error or loss, a power loss or too low a battery level, etc. FIG. 4 diagrammatically shows a fleet of robots of an automatic inspection system according to one embodiment of the invention implementing an automatic inspection method according to one embodiment of the invention, wherein the object is an aircraft 54. Three flying robots 14a, 14b, 14c are shown.

The step of determining a set of instructions allows, for example, each robot of the fleet to be allocated tasks, via displacement and image acquisition instructions, which tasks concern one portion of the surface to be inspected. For example, in the embodiment shown, a first flying robot 14a inspects the surface of the front 58 of the fuselage of the aircraft 54, a second flying robot 14b inspects the surface of the empennage 56 of the aircraft 54 and a third flying robot 14c inspects the surface of a portion 57 of a wing of the aircraft 54.

The flying robots 14a, 14b, 14c communicate via the communication module 32a, 32b, 32c through a wireless transmission with a control device 60, comprising the management module and the presentation module, with which a human operator interacts in order to monitor the progress of the inspection and potentially view the potential defects detected by the flying robots 14a, 14b, 14c. The wireless transmission takes place via one or more known communication protocols, for example Zigbee (IEEE 802.15.4) for control transmissions, Wi-Fi (IEEE 802.11) for data transmissions, and potentially a different radio protocol (for example of the DSM2/DSMX type in the 2.4 GHz band) for emergency transmissions.

The invention claimed is:

1. An automatic inspection system for automatically inspecting a surface of an object, said surface being liable to contain a defect, said system comprising a fleet, comprising at least one flying robot, each flying robot comprising:
   an image acquisition module acquiring images of at least one portion of the surface to be inspected, and
   a processing module processing the acquired images and providing a processing result comprising information representative of the state of each inspected surface portion, and a management module managing the fleet of robots, the management module determining, from a model of the surface to be inspected, a set of displacement instructions and image acquisition instructions for each robot of the fleet.

2. The automatic inspection system according to claim 1, wherein the image acquisition module of at least one robot of said fleet comprises at least one camera suitable for acquiring images within the visible light spectrum.

3. The automatic inspection system according to claim 1 further comprising a device presenting the results of each processing operation performed by each processing module of each robot of the fleet, and wherein each robot of the fleet comprises a communication module transmitting results of each processing operation to the presentation device.

4. The automatic inspection system according to claim 3, wherein the image acquisition module of at least one robot of said fleet comprises at least one camera suitable for acquiring images within the visible light spectrum and wherein the management module and the presentation device are arranged in a control device.

5. The automatic inspection system according to claim 4, wherein the control device comprises a human-machine interface suitable for displaying a 3D model of the surface to be inspected and for displaying a representation of a position of each robot of the fleet relative to the surface to be inspected in real time.

6. The automatic inspection system according to claim 1, wherein each robot of the fleet comprises a location determination module, suitable for combining each processing result with a location of said processing result relative to a coordinate system with regard to the surface to be inspected.

7. The automatic inspection system according to claim 1, wherein each robot of the fleet comprises an emergency module detecting a robot malfunction and, using a set of emergency tasks determined according to a position of the robot of the fleet relative to the object, said robot of the fleet performing at least one emergency task in the event of a malfunction.

8. The automatic inspection system according to claim 1, wherein each robot of the fleet comprises an obstacle detection module, whereby each robot of the fleet is suitable for performing an avoidance task to avoid at least one obstacle detected by the obstacle detection module.

9. The automatic inspection system according to claim 1, wherein the fleet comprises at least one rolling robot, each rolling robot comprising:
    a module acquiring images of at least one portion of the surface to be inspected, and
    a module processing the acquired images and providing and a processing result comprising information representative of the state of each portion of the inspected surface.

10. A method for using an automatic inspection comprising:
    determining a set of instructions allocated to each robot of a fleet of robots,
    carrying out a multiplicity of tasks by each robot of the fleet, said tasks comprising at least one acquisition operation of an image of a portion of a surface liable to contain a defect, and at least one processing operation of said image in order to detect a potential defect on the surface,
    transmitting the result of said processing operation of each robot to a presentation device, and
    presenting said processing result to a human operator in said presentation device.

11. The method according to claim 10, wherein the transmitting of the result of said processing operation by each robot is carried out after each processing operation.

12. A method for automatically inspecting a surface of an object, said surface being liable to contain a defect, the method comprising:
    acquiring images of at least one portion of the surface to be inspected by each flying robot of a fleet of robots comprising at least one flying robot,
    processing the acquired images in order to provide a processing result comprising information representative of the state of each inspected surface portion, and
    determining, based on a model of the surface to be inspected, a set of displacement instructions and image acquisition instructions for each robot of the fleet.

* * * * *